Oct. 15, 1957  J. G. PEARCE ET AL  2,810,098
HIGH-SPEED HUNTING CIRCUITS
Filed Nov. 25, 1955  3 Sheets-Sheet 2

Inventors
JAMES GORDON PEARCE
HENRY THOMAS VINCENT FOSTER
By
Young, Emery & Thompson
Attorneys

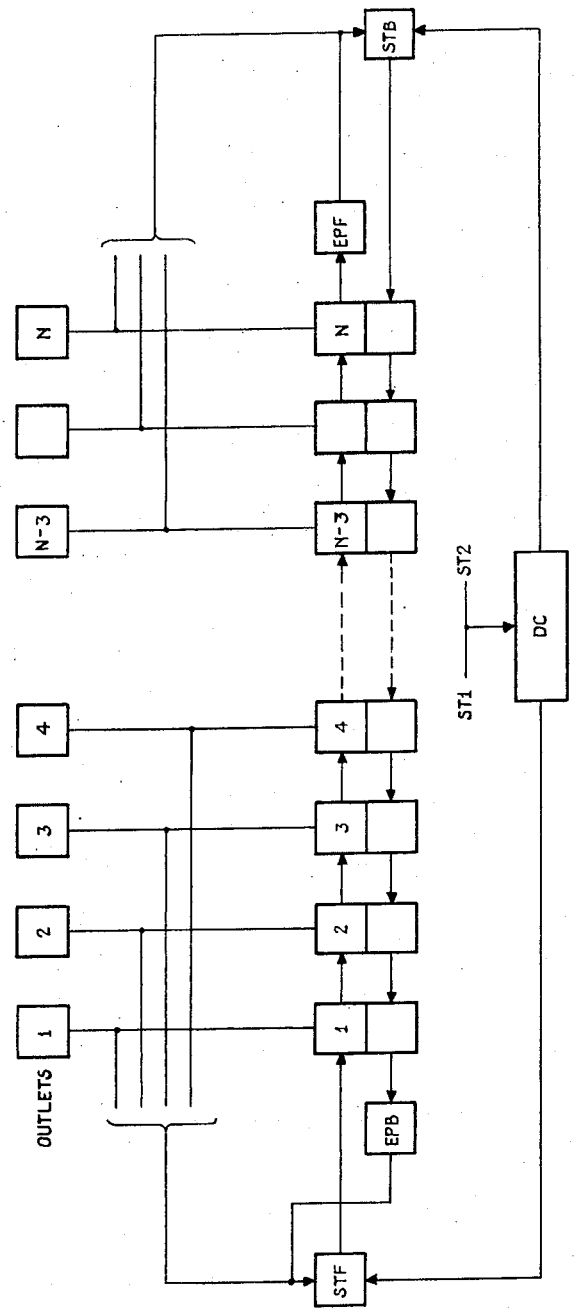

United States Patent Office 2,810,098
Patented Oct. 15, 1957

2,810,098

HIGH-SPEED HUNTING CIRCUITS

James G. Pearce and Henry Thomas Vincent Foster, Liverpool, England, assignors to Automatic Telephone & Electric Company Limited, Liverpool, England, a British company Application November 25, 1955, Serial No. 549,048

Claims priority, application Great Britain November 25, 1954

15 Claims. (Cl. 315—84.5)

The present invention relates to multi-stage switching devices and is more particularly concerned with hunting circuits arranged to operate at high speed.

The expression "high speed" as used herein is to be understood to mean that the time period between one stage of the circuit being operative and the next stage becoming operative is substantially the time taken to cause a gas discharge device in a stage to be struck on the previous stage becoming operative.

Hunting circuits of the high speed type have already been proposed and in these known circuits, the operation of a stage is effected by the application thereto of both a biasing potential and a pulse potential.

It is the main object of the present invention to provide a hunting circuit which does not require two potentials for its operation.

A further object of the invention is to provide a hunting circuit in which if a stage in the hunting circuit is faulty, the stages beyond the faulty stage are not rendered inaccessible.

Another object of the invention is to provide a hunting circuit in which the time taken to perform a hunting operation over a large number of outlets is reduced.

According to the invention, in a multi-stage switching device arranged for successive operation of the stages and provided with at least one gas discharge tube for each stage the circuit over which a striking potential is applied to the trigger electrode of a gas discharge tube of one stage from the cathode of a gas discharge tube of the preceding stage on the striking of the latter tube consists of non-reactive components only.

This method of operation, which is termed "D. C. operation" gives simpler circuits than the method previously mentioned which is known as the "pulse and bias" method.

According to another feature of the invention, a multi-stage switching device arranged for successive operation of the stages two groups of serially-arranged gas discharge tubes are provided, one tube from each group forming a stage and arrangements are provided whereby the successive operation of the stages takes place in one direction by the application of a potential to the tube of one group in the first stage of the device and alternatively in the other direction by the application of a potential to the tube of the other group in the last stage of the device.

According to a further feature of the invention, in circuit arrangements for hunting over a plurality of outlets successively and having a plurality of serially-arranged gas discharge tubes each individual to one outlet a test circuit for the appropriate outlet is connected to each gas discharge tube and the striking of a gas discharge tube causes a striking potential to be applied to the next gas discharge tube of the series and causes a potential to be applied to its test circuit which according as to whether the outlet is unavailable or available either renders said potential ineffective or causes said potential to be effective on a device which prevents the striking of the said next gas discharge tube.

According to yet another feature of the invention, in circuit arrangements for hunting over a plurality of outlets successively a plurality of gas discharge tubes are serially-arranged to form two separate groups, one tube from each group forming a stage individual to one outlet and arrangements are provided whereby the successive striking of the tubes of one group takes place in one direction by applying a potential to the tube of said one group in the first stage and alternatively the successive striking of the tubes of the other group takes place in the opposite direction by applying a potential to the tube of said other group in the last stage.

According to a still further feature of the invention, in circuit arrangements for hunting over a plurality of outlets successively a plurality of gas discharge tubes are serially-arranged to form two separate groups, one tube from each group forming a stage individual to one outlet and the successive striking of the tubes of one group is initiated by a potential applied from a start circuit to the tube of said one group in the first stage while if the successive striking of the said tubes is not completed within a predetermined period a second potential from said start circuit is applied to the tube of the other group in the last stage to cause the successive striking of the tubes of the other group in the opposite direction.

Where the hunting circuit has access to a large number of outlets, this facility of reverse hunting may be employed, according to another feature of the invention, to reduce the hunting time. According to this feature the group of outlets is divided into two, and a start condition in one group causes the hunting circuit to operate in the forward direction while a start condition in the other group causes the hunting circuit to operate in the backward direction.

These and other features of the invention will be better understood from the following description taken in conjunction with the accompanying drawings comprising Figs. 1 to 3. In the drawings:

Fig. 3 shows schematically a circuit using forward and backward operation to reduce the hunting time over a large group of outlets.

Figure 1:
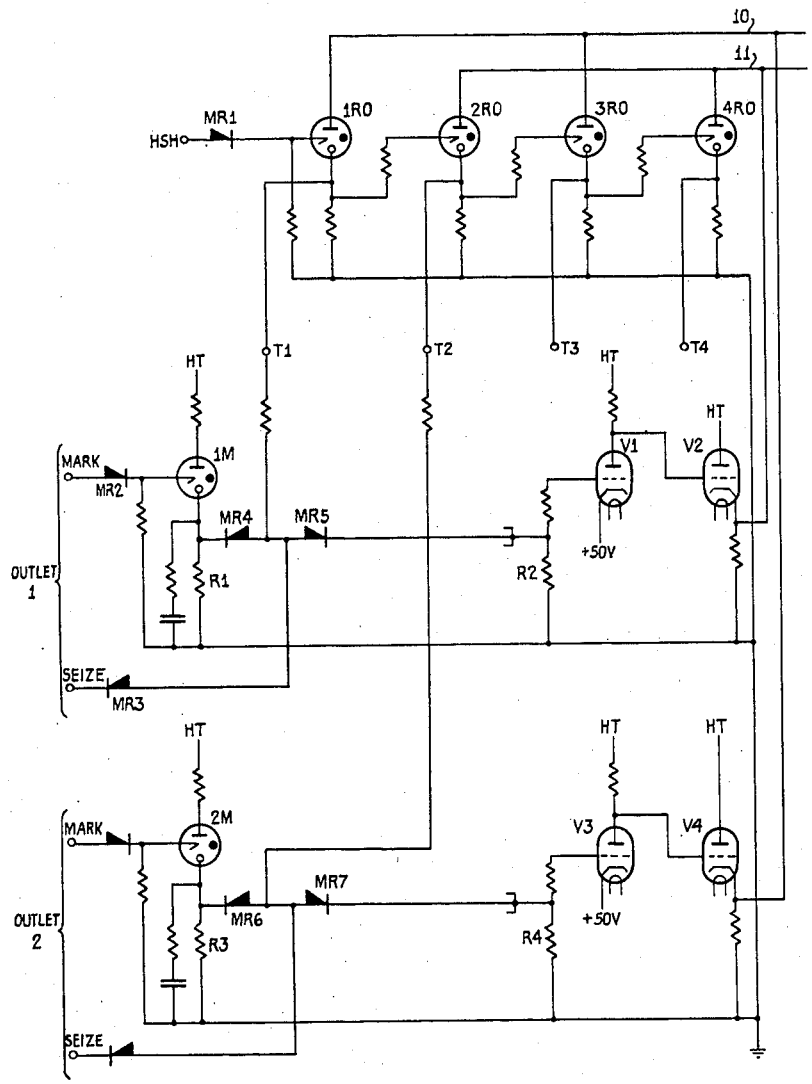
Fig. 1 shows the hunting circuit in its simplest form.

Referring first to Fig. 1, the hunting circuit comprises the gas discharge tubes 1RO, 2RO, 3RO and 4RO. The HT supply for the odd numbered tubes is provided over lead 10 from the cathode follower tube V4 and for the even numbered tubes over lead 11 from the cathode follower tube V2. As shown, the hunting circuit provides only four stages but it will be understood that further stages may be added as required.

Each outlet to which the hunting circuit has access is provided with a Mark lead and a Seize lead and these two leads are connected to a test circuit of which only two are shown in the drawing, namely those associated with tubes 1RO and 2RO. The Mark lead of outlet 1 is connected to the trigger electrode of a tube 1M and the cathode of the associated tube 1RO in the hunting circuit is connected to the cathode of the tube 1M through a rectifier MR4 and also through a rectifier MR5 to the control grid of thermionic tube V1 which is provided in common to all the odd-numbered outlets.

If an outlet is idle a positive potential is applied to the Mark lead and the tube in the associated test circuit will strike whereas if the outlet is unavailable the tube will be non-conducting. It will be assumed that the outlet 1 associated with tube 1RO is unavailable so that tube 1M is non-conducting but that the outlet 2 associated with tube 2RO is available and hence tube 2M is conducting.

The hunting operation is started by applying a positive potential from terminal HSH through the rectifier MR1, which acts merely as an isolator, to the trigger electrode of tube 1RO. Tube 1RO strikes and the positive cathode voltage is applied to the junction of rectifiers MR4 and MR5 in the corresponding test circuit. Since the tube 1M is non-conducting, that is to say, its cathode is at earth potential and further since the resistor R2 is considerably greater in value than the resistor R1, current flow due to the cathode voltage of 1RO takes place substantially entirely through the rectifier MR1 and the resistor R1 and since resistor R1 is of small value substantially no potential is applied to the Seize lead or the control grid of the thermionic tube V1, which is normally biased to cut off. The cathode potential of tube 1RO is also applied to the trigger electrode of tube 2RO and accordingly this tube strikes and the cathode potential thereof is applied to the junction of rectifiers MR6 and MR7 which correspond to the rectifiers MR4 and MR5 of the first test circuit. In this case, however, tube 2M is conducting and the voltage at the cathode of tube 2M is such that the rectifier MR6 is blocked to current flow from the cathode of tube 2RO. Current flow, however, does take place through rectifier MR7 but since resistor R4 is of high value, there is a substantial voltage applied to the Seize lead and to the control grid of the thermionic tube V1. This causes the thermionic tube V3 to conduct and the available outlet to be taken into use. The thermionic tube V3 in conducting causes the cathode follower tube V4 to be cut off thereby removing the HT supply from the odd-numbered tubes and in particular from tube 3RO. This removal of the HT supply will take place before tube 3RO strikes in response to the positive cathode voltage applied thereto by tube 2RO owing to the shorter response time of the thermionic tubes. The removal of the HT supply from tube 1RO causes it to be extinguished.

Figure 2:
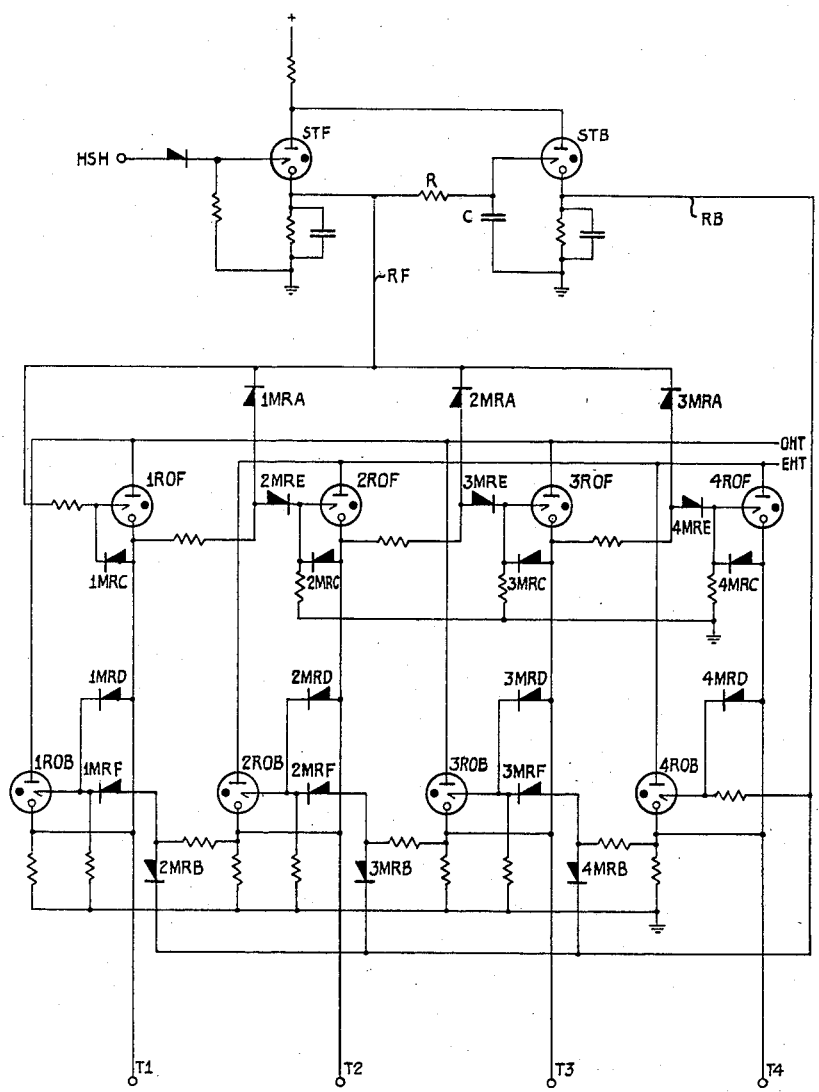
Fig. 2 shows the hunting circuit arranged for forward and backward operation.

Referring now to Fig. 2 it should be explained that this only shows the hunting circuit and not the test circuits, terminals T1, T2, T3 and T4 corresponding to the similarly numbered terminals in Fig. 1. In this embodiment two series of tubes are provided namely 1ROF to 4ROF and 1ROB to 4ROB and two start tubes STF and STB. The hunting circuit is started by the application of a positive potential to terminal HSH and this causes tube STF to strike.

Tube STF in striking applies a positive potential to the trigger electrode of tube STB over a relay circuit comprising resistor R and capacitor C and to the trigger electrode of tube 1ROF over the run forward control lead RF. Tube 1ROF strikes and the positive cathode potential is applied to the test circuit over terminal T1 and to the gate circuit consisting of rectifiers 1MRA and 2MRE. Owing to the high positive potential e. g. 120 volts, applied to lead RF, the positive potential applied to the gate circuit will be effective on the trigger electrode of tube 2ROF and this tube will strike. It will be noted that tubes 1ROF and 1ROB have a common cathode resistor and similarly for the other pairs of tubes. Tube 2ROF in striking repeats the pulse to tube 3ROF and to the test circuit over terminal T2. It will be noted that the cathode of 2ROB is connected to the trigger electrode of tube 1ROB to enable the hunting circuit to operate in the backward direction. However, it is not required that tube 1ROB should strike when tube 2ROF strikes and this is avoided by the provision of rectifier 2MRB which is connected to lead RB. Lead RB is at earth potential since tube STB is not conducting and hence current flows from the cathode of tube 2ROF over three parallel paths, one being the cathode resistor to earth, the second being rectifier 2MRB to earth over a resistor and the third being rectifier 1MRF to earth over a resistor. The values of the components in these paths are so chosen that the resulting potential at the trigger electrode of tube 1ROB is less than the striking potential but the potential at the trigger electrode of 3ROF is greater than the striking potential.

It will be understood that as described for the circuit of Fig. 1, if either outlets 1 or 2 are available, the hunting operation will be stopped by the removal of the HT supply and the available outlet seized as prepiously described. Assume now that the outlets corresponding to tubes 1ROF and 2ROF are unavailable while a fault has developed in the third stage of the hunt circuit so that the hunting circuit does not operate beyond this stage. The delay in the trigger circuit of tube STB is such that the hunting operation is normally completed before tube STB is able to strike. However, in the present instance, where a fault is present, tube STB will strike and apply a starting condition to the backward hunting circuit. Tube STB has a common anode resistor with tube STA and hence tube STA is extinguished. Tube 4ROB will strike following the striking of tube STB and tubes 3ROB, 2ROB and 1ROB will strike in succession.

In this case, a positive potential will be applied to the run back lead RB while the run forward lead RF will be at earth potential. Hence due to the connection of rectifiers 1MRA to 3MRA to this lead, tubes 4ROF to 2ROF are prevented from striking in response to the striking of tubes 3ROB to 1ROB respectively.

The rectifiers 1MRC, 1MRD and so on are provided to avoid reverse breakdown of, for instance, tube 1ROB when tube 1ROF is conducting. A path is available for current flow from the cathode of tube 1ROB to the rectifier 1MRD and then to earth through the trigger electrode resistor. It should be pointed out that if such reverse breakdown occurs it would not cause faulty operation of the circuit but it is preferred that it should not be allowed to happen.

Reference will now be made to Fig. 3 which shows in schematic form the application of the forward and backward operation to the case where a large number of outlets are concerned. The outlets are divided into two groups of which the first group comprising, as shown, outlets 1–4 is connected to the forward hunting start circuit STF while the remaining outlets numbered N–3 to N are connected to the backward hunting start circuit STB.

If a marking potential is applied from an outlet in the first group then the forward start circuit STF is operated whereas if the outlet is in the second group the backward start circuit STB is operated. If the hunting circuit is operating in the forward direction and fails to find a marked outlet, the end position circuit EPF will eventually be operated and this applies a starting condition to the backward starting circuit STB whereupon the hunting operation takes place in the reverse direction. A similar operation occurs if the initial hunting operation is in the backward direction. If during the forward or backward hunting operation, a faulty stage is reached the hunting circuit is operated in the reverse direction after the expiry of a predetermined time, as described in connection with the circuit of Fig. 2.

The actual method of operation is however, slightly different. A start condition applied from an outlet in the first group energizes the delay circuit DC over lead ST1 as well as operating the forward start circuit STF. Similarly a start condition from an outlet in the second group also energises the delay circuit DC over lead ST2 in addition to operating the backward start circuit STB. At the expiry of the predetermined time this delay circuit will energise both the start circuits STF and STB. One of these will, however, be already operated so that the delayed potential is effective only as regards the remaining start circuit and this causes the hunting operation to take place in the reverse direction. If at any time simultaneous start conditions are applied to both start circuits, it is arranged that one will have preference over the other.

It will be seen that all the embodiments described previously that there is some dissipation of the cathode potential of the tubes in the hunting circuit due to the use of the "rectifier gate" principle. It is therefore desirable to use discharge tubes capable in association with a suitable cathode resistor, of giving a large cathode potential swing. The tubes used in the circuits disclosed provide a swing of approximately 120 volts and have a striking potential of approximately 90 volts. It will thus be seen that this allows for a dissipation of some 30 volts and it is found that satisfactory operation of the circuits can be obtained with these values.

What is claimed is:

1. A switching device having a plurality of stages each including at least one gas discharge tube having an anode, a cathode and an ignition electrode and comprising an input lead connected to the ignition electrode of the tube of the first of said stages, a cathode load for each of the tubes, a plurality of output leads each connected to the cathode of the tube of each one of said stages, a plurality of coupling circuits consisting of non-reactive components having linear electrical characteristics and connecting the cathode of the tube of each one of said stages except the last stage to the ignition electrode of the tube of the next stage, means for applying a potential to the input lead to cause the successive ignition of the tubes of said stages due to the repetition of said potential from the cathode of the tube of one stage through a coupling circuit to the ignition electrode of the tube of the next stage and means for preventing the repetition of said potential from one stage to the next stage.

2. A switching device as claimed in claim 1 wherein said coupling circuits comprise resistors.

3. A switching device as claimed in claim 1 and comprising in addition a first common high tension supply for the anodes of the odd-numbered tubes, a second common high tension supply for the anodes of the even-numbered tubes, a plurality of test circuits each connected to the cathode of one of said tubes, means for conditioning said test circuits in one of two different ways, means responsive to the igniting of said tubes for applying potentials to the test circuits connected thereto, means responsive to the application of said potentials to said test circuits when in one condition for maintaining the connection of said first and second common high tension supplies to said odd and even-numbered tubes respectively, means responsive to the ignition of one of said odd-numbered tubes and to the resulting application of a potential to the associated test circuit when in the other condition for disconnecting said second common high tension supply from said even-numbered tubes and means responsive to the ignition of one of said even-numbered tubes and to the resulting application of a potential to the associated test circuit when in the other condition for disconnecting said first common high tension supply from said odd-numbered tubes.

4. A switching device comprising a plurality of cascade-connected gas discharge tubes each having an anode, a cathode and an ignition electrode, an input lead connected to the ignition electrode of the first of said tubes, a plurality of test circuits each one associated with one of said tubes and each one arranged to be conditioned in one of two different ways, a first common high tension supply for the anodes of the odd-numbered tubes, a second common high tension supply for the anodes of the even-numbered tubes, means responsive to the application of a potential to said input lead for causing the successive ignition of the tubes whereby potentials are applied successively to said test circuits, means responsive to the application of said potentials to said test circuits when in one condition for maintaining the connection of said first and second common high tension supplies to said odd and even-numbered tubes respectively, means responsive to the ignition of one of said odd-numbered tubes and to the resulting application of a potential to the associated test circuit when in the other condition for disconnecting said second common high tension supply from said even-numbered tubes and means responsive to the ignition of one of said even-numbered tubes and to the resulting application of a potential to the associated test circuit when in the other condition for disconnecting said first common high tension supply from said odd-numbered tubes.

5. A switching device as claimed in claim 4 wherein said test circuits each include first and second rectifiers, first and second load resistors for said first and second rectifiers respectively, said second load resistor having a greater value than said first load resistor, whereby a potential applied to said test circuit in said second condition causes current to flow only in said first load resistor, means for causing a blocking current to flow in said first load resistor when said test circuit is in said one condition for blocking said first rectifier whereby a potential applied to said test circuit causes current to flow only in said second load resistor and means responsive to the potential developed in said second load resistor for disconnecting one of said common high tension supplies.

6. A switching device as claimed in claim 5 wherein said test circuit also includes a gas discharge tube having at least an anode, a cathode and an ignition electrode, said first load resistor of said first rectifier forming the cathode load of said tube and means for igniting said tube whereby the current flow in said first load resistor serves to block said first rectifier.

7. A hunting circuit comprising a plurality of cascade-connected gas discharge tubes forming a first group, a plurality of cascade-connected gas discharge tubes forming a second group, a first input lead connected to the first gas discharge tube of said first group, a second input lead connected to the first gas discharge tube of said second group, a plurality of outlets each connected to one tube of said first and second groups of tubes, means for applying a potential to said first input lead to cause the tubes of said first group to ignite successively, the tubes in igniting applying a test potential successively in a particular order to said outlets, means for applying a potential to said second input lead to cause the tubes of said second group to ignite successively, the tubes in igniting applying a test potential successively in an order opposite to said particular order to said outlets, means for applying a marking potential to an outlet and means responsive to the coincidental application of a marking potential and a test potential to an outlet for taking the outlet into use and for preventing the igniting of further tubes.

8. A hunting circuit as claimed in claim 7 wherein each of said outlets comprises a gas discharge outlet tube having an anode, a cathode and an ignition electrode, a mark lead connected to the ignition electrode of said outlet tube, the application of positive potential to said mark lead serving to ignite sai doutlet tube, a cathode resistor for said outlet tube, first and second rectifiers having their negative poles connected together, a test lead connected to one tube in each of said groups of tubes and to the negative poles of said first and second rectifiers, means connecting the positive pole of said first rectifier to the cathode of said tube, means for preventing ignition of the tubes of said two groups of tubes and means connecting the positive pole of said second rectifier to said last-mentioned means whereby the potential applied to an outlet on the igniting of the corresponding tube of one of the groups causes current to flow through the first rectifier and the cathode resistor of said tube when said tube is non-conducting while if said tube is conducting, said first rectifier is blocked and current flows through said second rectifier to control said means for preventing ignition of the tubes of said two groups of tubes.

9. A hunting circuit as claimed in claim 8 wherein said means for preventing ignition of the tubes of said two groups of tubes includes a load resistor for said second rectifier and a thermionic tube connected in a cathode follower circuit, current flow through said second rectifier and load resistor serving to cut off said thermionic tube to prevent further ignition of the tubes of said groups of tubes.

10. A hunting circuit as claimed in claim 9 wherein said load resistor for said second rectifier has a higher value than said cathode resistor and a seize lead is connected to the negative poles of said first and second rectifiers whereby a potential is applied to said seize lead to take the outlet into use only when current flows through said second rectifier.

11. A hunting circuit comprising a plurality of cascade-connected gas discharge tubes forming a first group, a plurality of cascade-connected gas discharge tubes forming a second group, a first input lead connected to the first gas discharge tube of said first group, a second input lead connected to the first gas discharge tube of said second group, a plurality of test circuits each one associated with one tube of each of said groups, a plurality of outlets each individual to one of said test circuits, means in said outlets for conditioning said test circuits in one of two different ways, a start lead, a first starting gas discharge tube to which said start lead is connected, a second starting gas discharge tube, a timing circuit interconnecting said first and second starting gas discharge tubes, means responsive to the application of a potential to said start lead for causing the ignition of said first starting tube, means responsive to the ignition of said first starting tube for applying a potential to said timing circuit to cause the ignition of said second starting tube a predetermined time after the ignition of said first starting tube, means also responsive to the ignition of said first starting tube for applying a potential to said first input lead to cause the tubes of said first group to ignite successively whereby voltages are applied to said test circuits in a particular order, means responsive to the ignition of said second starting tube for applying a potential to said second input lead to cause the tubes of said second group to ignite successively whereby voltages are applied to said test circuits in an order opposite to said particular order, means responsive to the ignition of one tube of said first group for applying a potential to the associated test circuit, means responsive to the application of said potential to said test circuit when conditioned in one way for enabling the igniting of the tube of the first group next connected to said one tube, means responsive to the application of said potential to said test circuit when conditioned in the second way for preventing the igniting of the tube of the first group next connected to said one tube, means responsive to the ignition of one tube of said second group for applying a potential to the associated test circuit, means responsive to the application of said potential to said test circuit when conditioned in one way for enabling the igniting of the tube of the second group next connected to said one tube and means responsive to the application of said potential to said test circuit when conditioned in the second way for preventing the igniting of the tube of the second group next connected to said one tube.

12. A hunting circuit comprising a plurality of cascade-connected gas discharge tubes forming a first group, a plurality of cascade-connected gas discharge tubes forming a second group, a first input lead connected to the first gas discharge tube of said first group, a second input lead connected to the first gas discharge tube of said second group, a plurality of outlets each connected to one tube of said first and second groups of tubes, means for applying markings to said outlets, means for applying a potential to said first input lead to cause the tubes of said first group to ignite successively, the tubes in igniting serving to test said outlets successively in a particular order for the first outlet to which a marking has been applied, means responsive to a marked outlet being found for preventing the ignition of further tubes in said first group, timing means to which said potential is also applied and which responds if no marked outlet is found within a predetermined period to apply a potential to said second input lead to cause the tubes of said second group to ignite successively, the tubes in igniting serving to test said outlets successively in an order opposite to said particular order for the first outlet to which a marking has been applied and means responsive to a marked outlet being found for preventing the ignition of further tubes in said second group.

13. A hunting circuit comprising a first group of outlets, a second group of outlets, a plurality of cascade-connected gas discharge tubes forming a first group, a plurality of cascade-connected gas discharge tubes forming a second group, each outlet being connected to a tube in each of said groups of tubes, a first start circuit for said first group of outlets, a second start circuit for said second group of outlets, means responsive to a start condition on an outlet of said first group for energising said first start circuit to cause a potential to be applied to the first tube of said first group of tubes whereby said tubes ignite in succession to hunt over the outlets in a particular order for the outlet having a start condition thereon and means responsive to a start condition on an outlet of said second group for energising said second start circuit to cause a potential to be applied to the first tube of said second group of tubes whereby said tubes ignite in succession to hunt over the outlets in an order opposite to said particular order for the outlet having a start condition thereon.

14. A hunting circuit as claimed in claim 13 and including first and second end position circuits, means responsive to the igniting of the last tube of said first group of tubes for energising said first end circuit, means responsive to the energising of said first end circuit for energising said second start circuit, means responsive to the igniting of the last tube of said second group of tubes for energising said second end circuit and means responsive to the energising of said second end circuit for energising said first start circuit.

15. A hunting circuit as claimed in claim 14 and including in addition a delay circuit, means responsive to the energisation of said first start circuit for energising said delay circuit, means responsive to the energisation of said second start circuit for energising said delay circuit and means in said delay circuit responsive after the lapse of a predetermined period for energising said first and said second start circuit.

References Cited in the file of this patent
UNITED STATES PATENTS

| | | |
|---|---|---|
| 2,623,108 | Holden | Dec. 23, 1952 |
| 2,669,390 | Manley | Feb. 16, 1954 |
| 2,685,683 | Holden et al. | Aug. 3, 1954 |
| 2,714,180 | Manley | July 26, 1955 |